United States Patent [19]

Kondo

[11] Patent Number: 5,157,562
[45] Date of Patent: Oct. 20, 1992

[54] HIGH-SPEED MAGNETIC TAPE TRANSFER APPARATUS ALLOWING USE OF A SMALLER CAPACITY REEL MOTOR BY ASSISTING THE HIGH-SPEED TRANSFER WITH A CAPSTON MOTOR

[75] Inventor: Yuji Kondo, Saitama, Japan

[73] Assignee: Kabushiki Kaisha Toshiba, Kawasaki, Japan

[21] Appl. No.: 708,843

[22] Filed: May 30, 1991

Related U.S. Application Data

[63] Continuation of Ser. No. 377,821, filed as PCT/JP88/01068, Oct. 20, 1988, abandoned.

[30] Foreign Application Priority Data

Oct. 20, 1987 [JP] Japan .............................. 62-262651

[51] Int. Cl.⁵ .................. G11B 15/46; G11B 15/44
[52] U.S. Cl. .................. 360/73.06; 360/73.04; 360/71
[58] Field of Search ............. 360/73.05, 73.06, 73.07, 360/73.08, 71, 73.01, 73.04–73.08

[56] References Cited

U.S. PATENT DOCUMENTS

| | | | |
|---|---|---|---|
| 4,172,231 | 10/1979 | d'Alayer et al. | 360/72.3 |
| 4,196,875 | 4/1980 | Tatekawa et al. | 360/73.14 |
| 4,318,140 | 3/1982 | Shigeta | 360/73.08 |
| 4,341,363 | 7/1982 | Inatome | 360/73.04 |
| 4,521,815 | 6/1985 | Tokuyama | 360/73.11 |
| 4,527,210 | 7/1985 | Takamatsu | 360/105 |
| 4,649,441 | 3/1987 | Louth | 360/73.06 |

FOREIGN PATENT DOCUMENTS

| | | |
|---|---|---|
| 56-83863 | 7/1981 | Japan . |
| 59-75443 | 4/1984 | Japan . |
| 59-132448 | 7/1984 | Japan . |

Primary Examiner—A. J. Hienz
Assistant Examiner—Jefferson Evans
Attorney, Agent, or Firm—Cushman, Darby & Cushman

[57] ABSTRACT

This invention relates to a high-speed magnetic tape transfer apparatus which has a reel motor for transferring tape wrapped around a cylinder having a rotary head at high speed and a capstan motor for transferring the tape at a standard speed. A detection section detects either a predetermined amount of the magnetic tape wound around a reel, a predetermined speed of the tape, or a predetermined current flowing in the reel motor, and generates a signal responsive thereto. A control section switches a device for transferring the magnetic tape from the reel motor to the capstan motor in response to the detection signal.

4 Claims, 4 Drawing Sheets

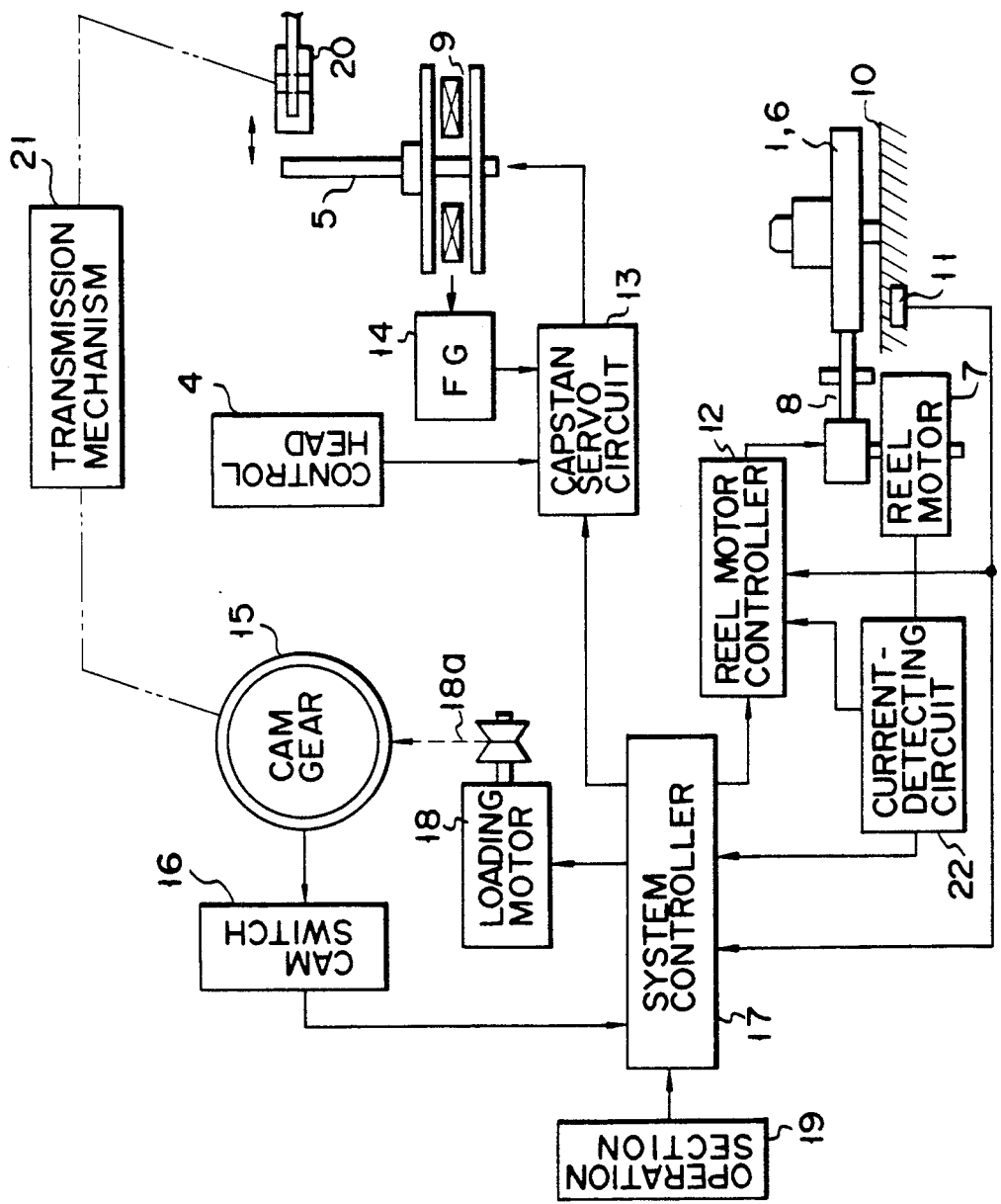
F I G. 2 ative apparatus.

HIGH-SPEED MAGNETIC TAPE TRANSFER APPARATUS ALLOWING USE OF A SMALLER CAPACITY REEL MOTOR BY ASSISTING THE HIGH-SPEED TRANSFER WITH A CAPSTON MOTOR

This is a continuation of application Ser. No. 07/377,821, filed as PCT/JP88/01068, Oct. 20, 1988, which was abandoned upon the filing hereof.

TECHNICAL FIELD

The present invention relates to an high-speed magnetic tape transfer apparatus for transferring magnetic tape between two reels set in a magnetic data-recording/reproducing apparatus, and more particularly to a high-speed magnetic tape transfer apparatus for performing fast-forward/rewind (hereinafter, referred to as FF/REW) of magnetic tape by full-loading method in a video tape recorder (hereinafter referred to as VTR).

BACKGROUND ART

To perform the FF/REW of magnetic tape by the fullloading method in a VTR, with the magnetic tape wrapped around the cylinder which has a magnetic head mounted on it, the reel mounts supporting the tape are driven at high speed, while the standard-speed drive system having capstans and pinch rollers is held in released condition. More precisely, as is shown in FIG. 1, the tape 2 fed supplied from a supply (S) reel mount 1 is wrapped about half around the cylinder 3, as it is transferred at the standard speed during the playback/recording (PLAY/REC) operation. The tape 2 is guided by an audiocontrol erase (ACE) head 4 and a capstan 5 and is taken up around a take-up (T) reel mount 6. The ACE head 4 detects control pulses, and index search is carried out. The winding or fast-forward transfer of the tape 2 is performed by the S reel mount 1 or the T reel mount 6 being rotated by a idler 8 which in turn is rotated by a reel motor 7. If the end portion of the tape 2 is transferred at high speed, the tape 2 will be removed from the reel due to the time-lag between the detecting of the tape end and the braking of the reel mount. Therefore, the voltage applied on the reel motor 7 is controlled to reduce the speed of the motor 7, thus decreasing the speed of the tape 2. When a clutch-less reel-driving mechanism is employed, this mechanism must perform, with high reliability, both the PLAY/REC operation which is a low-speed operation, and the FF/REW operation, which requires great torque.

When the clutch-less reel-driving mechanism that transfers the tape 2 performs both the low-speed PLAY/REC operation and the high-speed, large-load FF/REW operation, the reel motor 7 must provide a large starting torque. Further, the reel motor 7 must have a long lifetime despite the great load applied on it, and it must be able to rotate stably even at a low speed. These requirements greatly increase cast. When the tape 2 is has been damaged, the load applied during the FF/REW operation is, in some cases, so large that the tape 2 can no longer be taken up. Numeral 9 designates a capstan motor, and numeral 20 denotes a pinch roller. The pinch roller 20 is out of contact with the capstan 5 during the FF/REW operation.

DISCLOSURE OF THE INVENTION

As has been the drawback of, the conventional high-speed tape transfer mechanism is that it requires an expensive reel motor. This is because the reel motor must provide a great starting torque and resist a large load while magnetic tape, full-loaded on the cylinder, is being transferred at high speed during the FF/REW operation, and also because the reel motor must transfer the magnetic tape at a standard low speed during the PLAY/REC operation. Accordingly, the object of the present invention is to provide a high-speed magnetic tape transfer apparatus which can reduce the torque which a reel motor must provide, and can therefore use an inexpensive reel motor.

To attain the above object, according to the present invention, there is provided a high-speed magnetic tape transfer apparatus for use in a magnetic recording/reproducing apparatus in which magnetic tap is wrapped around a cylinder having a rotary head and is transferred at high speed during the fast-forward/rewind operation. The magnetic tape transfer apparatus has a reel motor for transferring tape at high speed, and a capstan motor for transferring the tape at a standard speed. The tape transfer apparatus comprises detecting means for detecting a predetermined amount of tape wound around a reel during the FF/REW operation; and control means for switching a used device for transferring the tape from the reel motor to the capstan motor in response to the detection signal.

In another embodiment of the invention, the detecting means detects a predetermined speed of tape wound about a reel during the FF/REW operation.

In still another embodiment of the invention, the detecting means detects a predetermined current flowing in the reel motor in the high-speed tape transfer mode.

In each embodiment of the apparatus described above, an electric signal is generated which substantially corresponds to the detection signal. When this electric signal rises above a predetermined value, the control means switches the device for transferring the tape from the reel motor to the capstan motor. Hence, the torque which the reel motor must provide is reduced, and an inexpensive motor can be used as the reel motor.

BRIEF DESCRIPTION OF THE DRAWINGS

The above object and other objects of the present invention, and the features of the invention will be understood from the following description of the accompanying drawings, in which:

FIG. 2 is a diagram showing a magnetic tape transfer apparatus according to one embodiment of the present invention;

BEST MODE OF EMBODYING THE INVENTION

Figure 1:
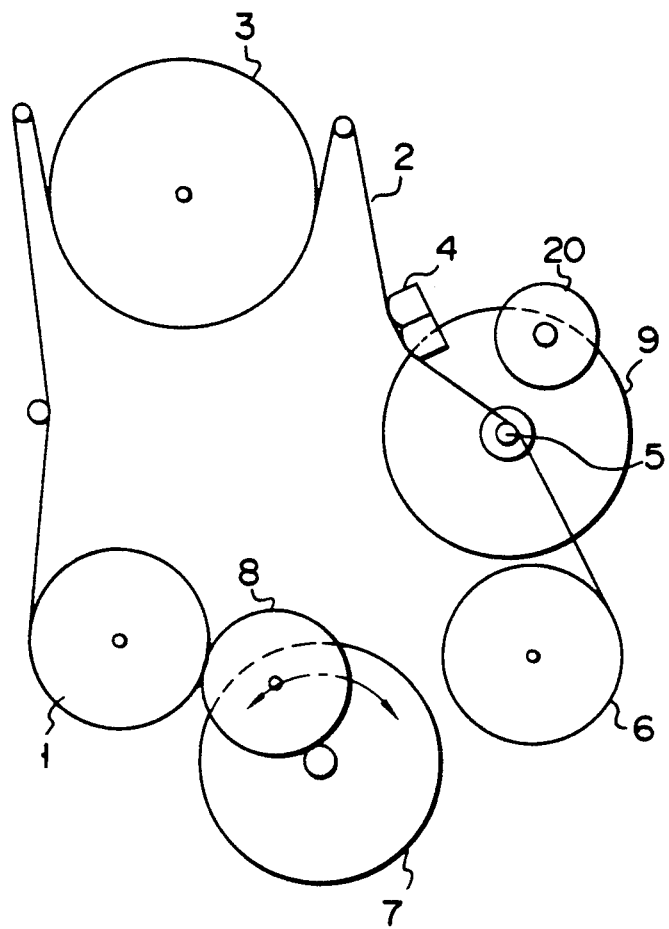
FIG. 1 is a plan view showing the tape path of a VTR.

FIG. 2 shows one embodiment of a high-speed tape transfer apparatus in accordance with the present invention. In this figure, the components that are identical or similar to those of the tape path shown in FIG. 1 are designated by the same numerals. The tape path shown in FIG. 2 is similar to the conventional one, and will not be described in detail. Either a reel mount 1 or a reel mount 6 is selected and rotated as an idler 8 is rotated by a reel motor 7. These reel mounts 1 and 6 are supported by a reel base 10. Pulse detectors 11 are attached to the reel base 10, for detecting the rotation of the reels (not shown) placed on the reel mounts 1 and 6. The amount of the tape wound around each reel is determined from the number of rotations of the reel, which has been detected by the pulse detector 11. A reel motor controller 12 and a system controller 17 (later described) are connected to the reel motor 7. The controller 12 stops the reel motor 7 when the amount of tape determined by pulse detector 11 reaches a predetermined value.

A capstan servo circuit 13 and a rotational speed detector (FG) 14 are connected to a capstan motor 9. A cam gear 15 is rotated to set various operation modes to a magnetic recording/reproducing apparatus, whereby a cam switch 16 is operated for switching the system controller 17. The system controller 17 drives a loading motor 18 to set prescribed operation modes in accordance with the operation at an operation section 19. A transmission mechanism 18a transmits the rotation of the loading motor 18 to the cam gear 15. Also, the system controller 17 controls the capstan servo circuit 13 and the reel motor controller 12 in accordance with the operation modes, whereby the capstan motor 9 and the reel motor 7 are driven under the control of the system controller 17.

In FIG. 2, numeral 20 denotes a pinch roller. This pinch roller 20 can be attached to, and detached from, a capstan 5 by means of a transmission mechanism 21 (later described) which functions in interlock with the cam gear 15.

The operation of the embodiment will now be explained. It is assumed here that the operation section 19 has been operated, setting the FF mode to the system controller 17. As illustrated in FIG. 2, when system controller 17 is in the FF mode, the tape 2 drawn from the reel on the S reel mount 1 is wrapped around a cylinder 3, is guided by an ACE head 4 and a capstan 5, and is taken up at high speed around the reel on the T reel mount 6. At the beginning, the tape 2 is taken up at high speed by rotating the T reel mount 6 by means of the reel motor 7 and the idler 8. During this high-speed transfer of the tape 2, the pinch roller 20 is not pressed onto the capstan 5. As the tape transfer proceeds, and the diameter of the tape roll on the T reel mount 6 increases, the amount of tape detected by the pulse detector 11 reaches and surpasses the predetermined value. Then, the reel motor controller 12 stops the reel motor 7 temporarily, and the system controller 17 drives the loading motor 18 and hence the cam gear 15, thereby pressing the pinch roller 20 onto the capstan 5. As a result, the capstan motor transfers he tape 2. In this condition, the reel motor 7 is rotating again, but the load on the motor 7 has been much reduced. Therefore, the torque required to transfer the tape 2 has likewise been reduced. When the REW mode is set, the tape 2 will be transferred from the T reel mount 6 to the S reel mount 1, in the same way as has been described.

Figure 3:
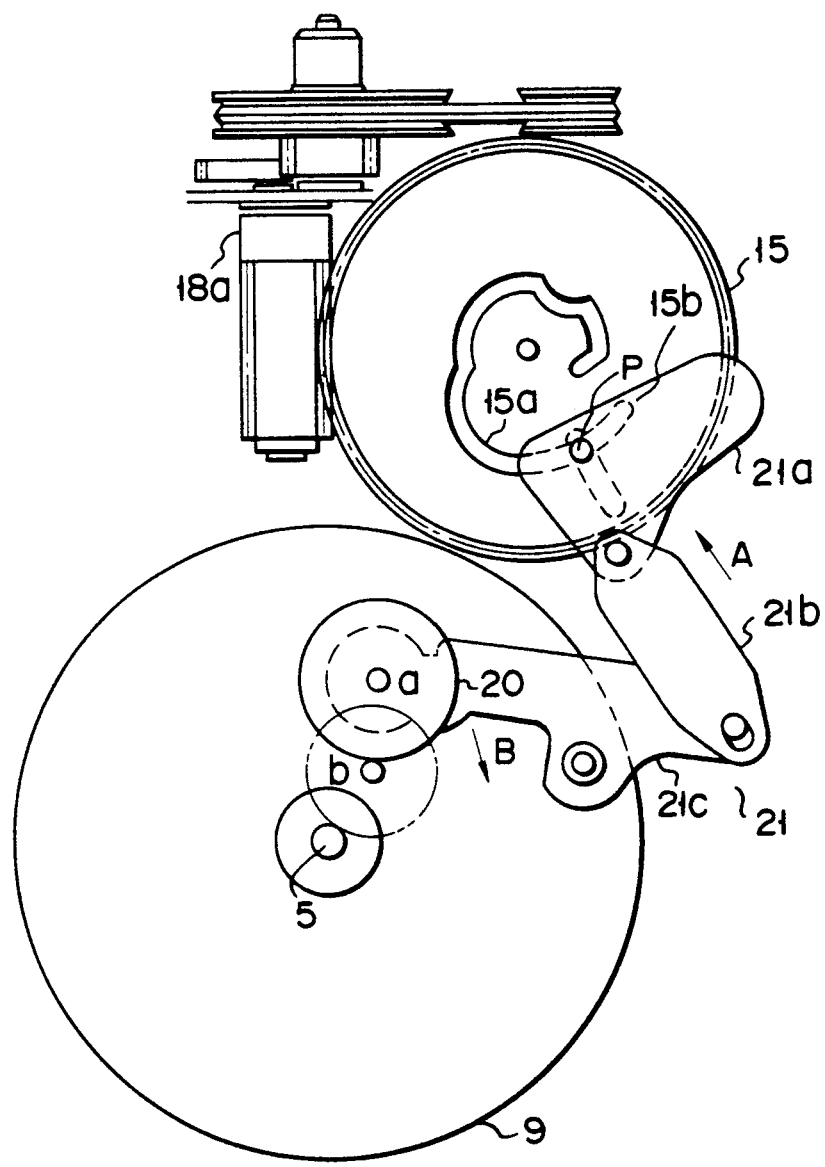
FIG. 3 is a diagram showing the transmission mechanism shown in FIG. 2, which comprises a cam gear and a pinch roller.

FIG. 3 shows the transmission mechanism 21 in detail. The same numerals are used in this figure to denote the same components as shown in FIG. 2. The cam gear 15, which is rotated by the loading motor 18 and the transmission mechanism 18a, has various grooves (not shown) defining the operation modes and a groove 15a designed for controlling the pinch roller 20. A first lever 21a has a pin P partly placed in this groove 15. The first lever 21a is moved, along with a second lever 21b, in the direction of arrow A when the cam gear 15 is rotated. The pinch lever 21c, which is linked to the second lever 21b, is rotated in the direction of arrow B. The pinch roller 20, which is rotatably supported by the distal end of the pinch lever 21c, moves from the position a indicated by solid lines to the position b indicated by broken lines, thus pressing the tape 2 onto the capstan 5. In other words, the pinch roller 20 can come into or out of contact with the capstan 5, in accordance with the position of the cam gear 15.

Figure 4:
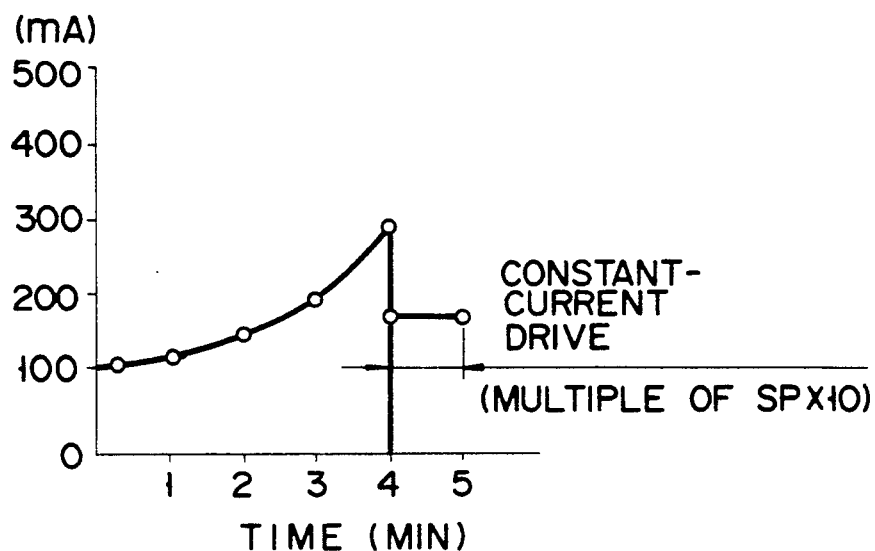
FIGS. 4 and 5 are graphs representing the relationship between the take-up time and the current of the reel motor observed in the embodiment of the invention, and that observed in the conventional apparatus.
Figure 5:
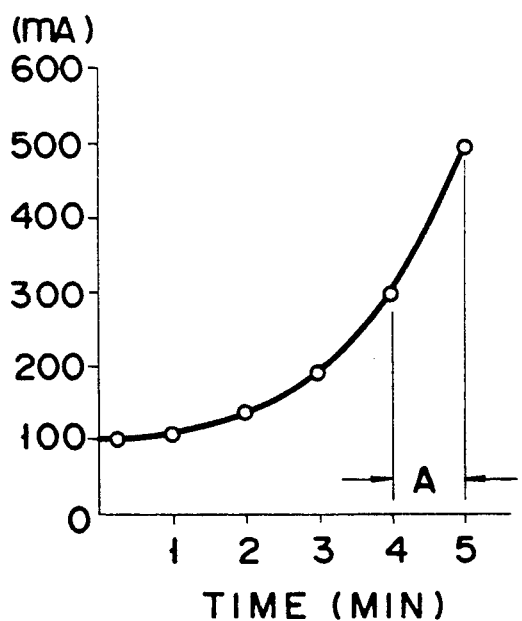

In this embodiment, the tape 2 is transferred mainly by the capstan motor 9, and the current flowing in the capstan motor 9 is substantially constant after the predetermined amount of the tape 2 has been taken up, as can be understood from FIG. 4. In the conventional apparatus, the load on the reel motor 7 increases in the period A as more and more tape is taken up in the FF/REW mode, and the current flowing in the reel motor 7 abruptly increases, as is evident from FIG. 5. In addition, since the load on the reel motor 7 is greatly reduced, the current flowing in the reel motor 7 does not increase, even while the end portion of the tape is being taken up. Hence, the capacity of the reel motor can be reduced, and the lifetime thereof can be lengthened. Further, even if the tape 2 has been damaged too much to allow its transfer in the FF/REW mode, the damage tape can still be taken up merely by switching the transfer mode to the capstan-drive mode. The apparatus is thus greatly reliable.

In the embodiment described above, the tape transfer is switched from the transfer achieved by the reel motor 7 to the transfer achieved by the capstan motor 9, when pulse detector 11 detects that the amount of the tape taken up around a reel reaches the predetermined value. In a second embodiment of the invention as is shown in FIG. 2, a current-detecting circuit 22 can be used to detect the current flowing through the reel motor 7, and the tape transfer can be switched from the transfer achieved by the reel motor 7 to the transfer achieved by the capstan motor 9 when the current increases to a predetermined value or more. In still another embodiment, the switching of the transfer mode can be performed by detecting the transfer speed of the tape.

As has been described, according to the present invention, during the FF/REW operation of a magnetic recording/reproducing apparatus in which the tape is fully loaded on a cylinder, the device for transferring tape is switched from the reel motor to the capstan motor in accordance with the amount of the tape taken up around a reel. Therefore, the capacity of the reel motor can be reduced, and its lifetime can be lengthened. Moveover, by using the present invention, the tape can be taken up with higher reliability than with the conventional apparatus.

I claim:

1. A high-speed magnetic tape transfer apparatus comprising:

means for transferring a tape at a constant speed, including a capstan, a pitch roller, and a capstan motor;

high-speed transfer mode setting means for setting at least one of a fast forward and a fast rewind mode in a magnetic tape recording/reproducing device;

high-speed transfer path means having a pair of reel mounts and a cylinder loaded with a rotary head, for forming a path capable of high-speed transfer in the fast forward mode or rewind mode, such that the magnetic tape, which is wound on a pair of reels mounted on said reel mounts, is separated from the capstan and the pinch roller for transferring the tape at constant speed with said magnetic tape being wound around the cylinder;

high-speed transfer drive means having a reel motor and a power transmission mechanism for driving the highspeed transfer by selectively transmitting power from said reel motor to one of said pair of reel mounts in accordance with the fast forward mode or rewind mode set by said high-speed transfer mode setting means;

real motor drive control means for controlling said reel motor to transfer the magnetic tape at high-speed in the fast forward mode or rewind mode set by said high-speed transfer mode setting means;

load detection means for detectng a predetermined load value resulting from an increase in load applied to said reel motor when said magnetic tape is transferred at high-speed in the fast forward mode or rewind mode;

reel motor interruption means for temporarily stopping the reel motor when the predetermined value is detected by said load detection means and starting the reel motor when the capstan motor is driven to assist the high-speed tape transfer; and assist means for mechanically causing the capstan and the pinch roller to engage the magnetic tape when the predetermined value is detected by said load detection means, so that the capstan motor assists the reel motor in the high-speed transfer;

wherein said high-speed magnetic tape transfer apparatus allows the use of a smaller capacity reel motor because the load on said reel motor is effectively reduced an the current flowing in said reel motor does not increase while an end portion of the magnetic tape is being wound around one of the pair of reels by using the capstan motor to assist in the high-speed tape transfer.

2. A high-speed magnetic tape transfer apparatus according to claim 1, wherein said load detection means includes means for detecting a predetermined amount of tape wound around one of the pair of reels which is driven by said high-speed transfer drive means.

3. A high-speed magnetic tape transfer apparatus according to claim 1, wherein said load detection means includes means for detecting the speed at which the tape is being transferred by said high-speed transfer drive means.

4. A high-speed magnetic tape transfer apparatus according to claim 1, wherein said load detection means includes means for detecting a predetermined current flowing in the reel motor driven by said high-speed transfer drive means.

* * * * *

UNITED STATES PATENT AND TRADEMARK OFFICE
CERTIFICATE OF CORRECTION

PATENT NO. : 5,157,562
DATED : OCTOBER 20, 1992
INVENTOR(S) : KONDO

It is certified that error appears in the above-identified patent and that said Letters Patent is hereby corrected as shown below:

On title page, item [54] and col. 1, lines 1-4

Please Change:

"(54) HIGH-SPEED MAGNETIC TAPE TRANSFER APPARATUS ALLOWING . . . TRANSFER WITH A CAPSTON MOTOR"

TO

--(54) HIGH-SPEED MAGNETIC TAPE TRANSFER APPARATUS ALLOWING . . . . TRANSFER WITH A CAPSTAN MOTOR--

Signed and Sealed this

Twenty-second Day of March, 1994

Attest:

BRUCE LEHMAN

*Attesting Officer*   *Commissioner of Patents and Trademarks*